United States Patent

[11] 3,596,936

[72] Inventors John J. Dieckmann
 Harrisonburg;
 Donald V. Bowman, Dayton; Anthony M. Castello, Harrisonburg, all of, Va.
[21] Appl. No. 874,472
[22] Filed Nov. 6, 1969
[45] Patented Aug. 3, 1971
[73] Assignee Dunham-Bush, Inc.
 West Hartford, Conn.

[54] QUICK CONNECT AIR DUCT FITTINGS
 10 Claims, 8 Drawing Figs.
[52] U.S. Cl............................................. 285/149,
 285/158, 285/396, 285/423
[51] Int. Cl....................................... F16l 39/00,
 F16l 59/00
[50] Field of Search............................................. 285/210,
 158, 209, 6, 361, 47, 189, 396, 423, 331, 74, 149

[56] References Cited
UNITED STATES PATENTS
| 833,239 | 10/1906 | Plunkett | 285/210 |
|---|---|---|---|
| 3,048,946 | 8/1962 | Hawk et al. | 285/158 X |
| 3,185,503 | 5/1965 | Angle | 285/361 X |
| 3,214,199 | 10/1965 | Brooks | 285/189 |

Primary Examiner—Thomas F. Callaghan
Attorney—Mason, Fenwick and Lawrence

ABSTRACT: A quickly connectable attachment system for joining a smaller air tube to a larger cylindrical duct at one end and to an annular terminator device at the other end, including a molded plastic coupling member having coaxial neck and outer cylindrical flange portions with a circular face plate portion therebetween having bayonet slot and protrusion formations thereon, to be fitted on the respective ends of the air tube. A similar integral molded coupling member has a neck to extend through a hole in the side of the larger duct, an outer cylindrical flange to abut the exterior wall of the duct in sealed relation, and a circular flat face plate portion therebetween also having bayonet slots and protrusions to mate with the bayonet protrusions in slots of the first mentioned coupling member. Spring clips slidably and tiltably supported in slots in the second coupling member have shoulder portions extendible through the air passage in the second coupling member to inwardly abut wall portions of the duct and hold the coupling member in place. The terminator device also has a surface to abut the face plate of one of the first coupling members and bayonet protrusions to interfit in bayonet slots of the first coupling member as well as spaces to receive the bayonet protrusions of the first coupling member.

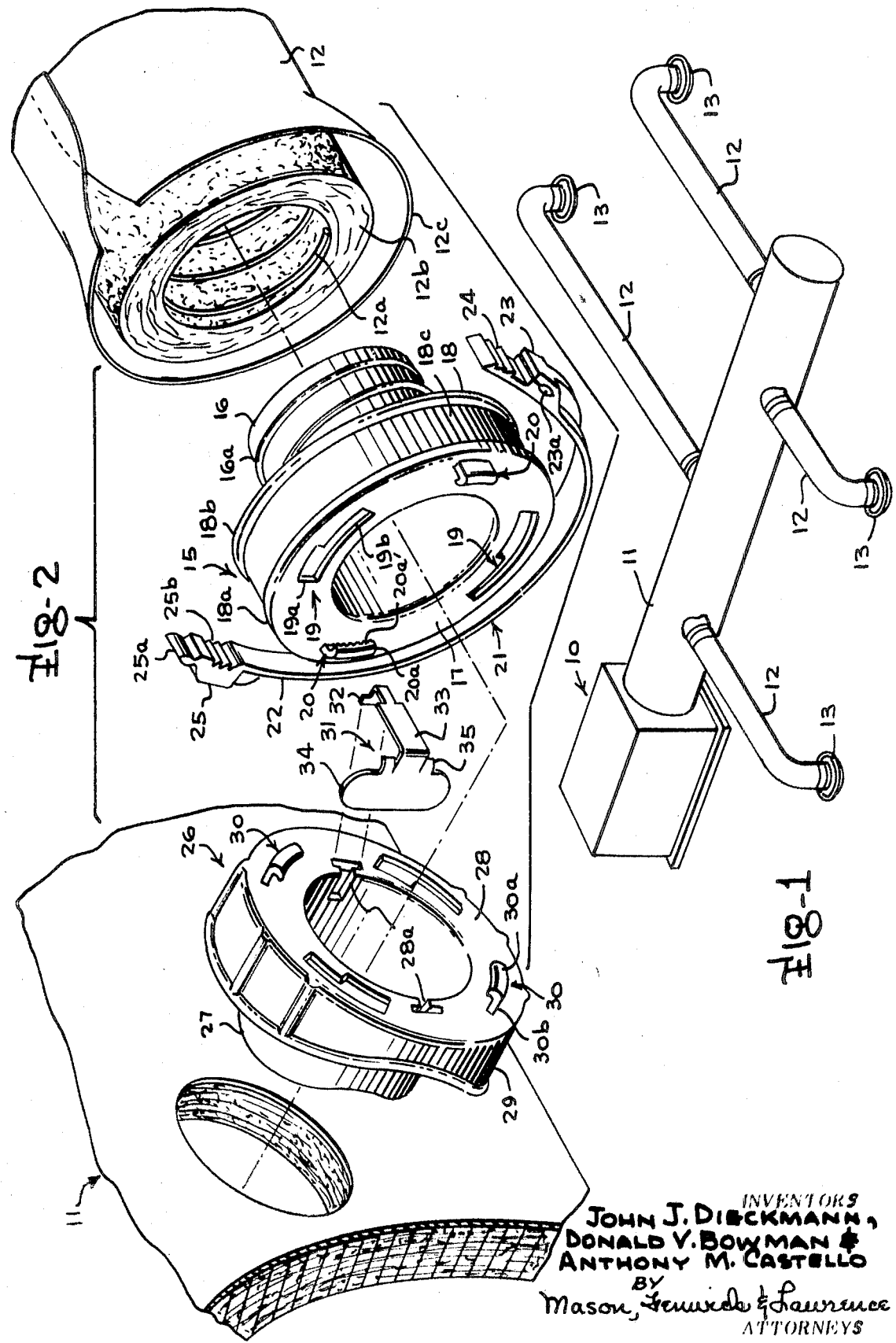

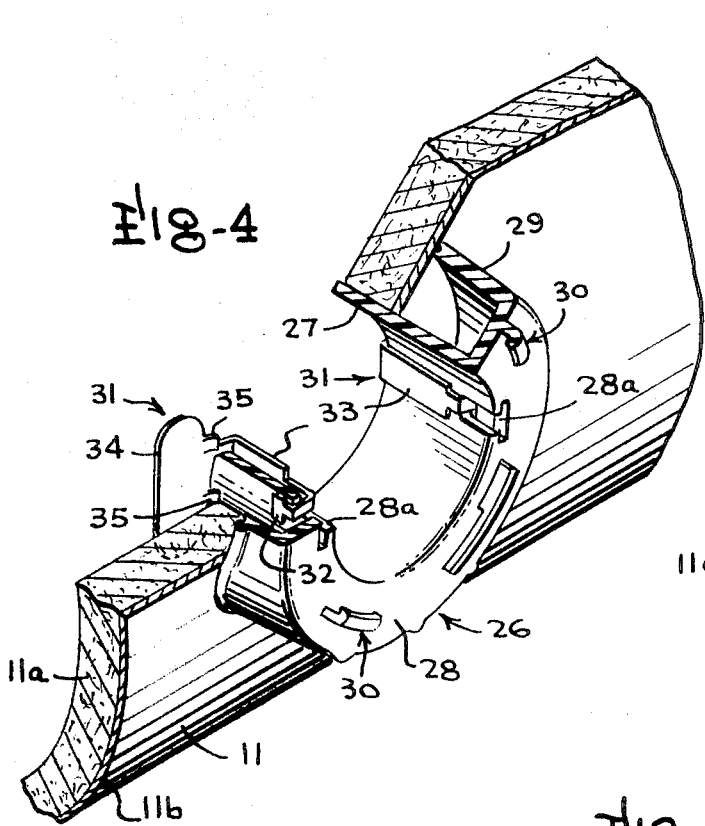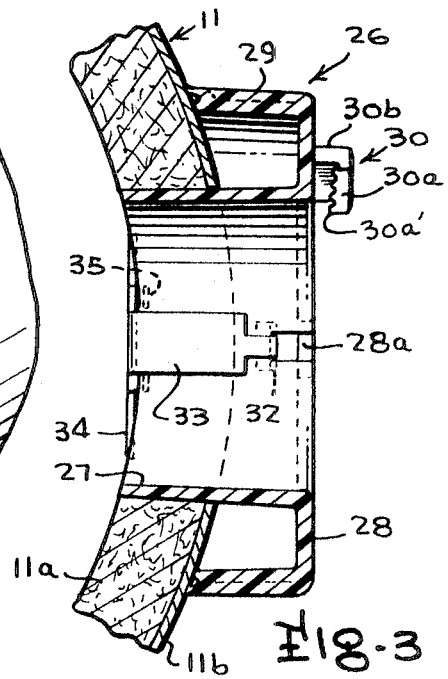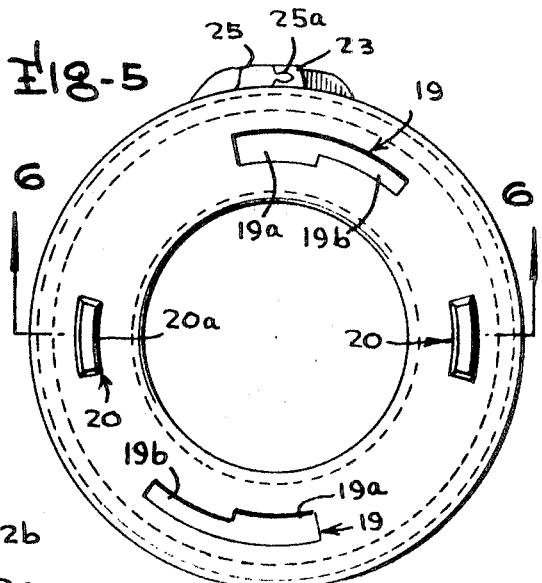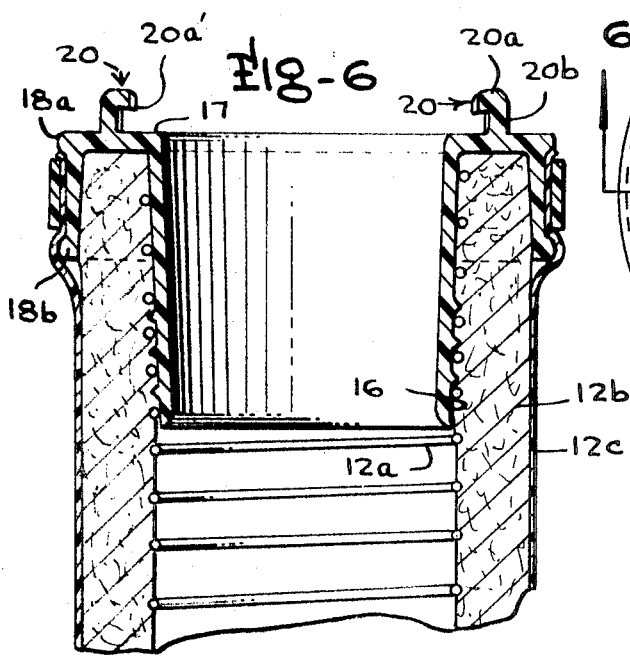

INVENTORS
JOHN J. DIECKMANN,
DONALD V. BOWMAN &
ANTHONY M. CASTELLO
BY Mason, Fenwick & Lawrence
ATTORNEYS

QUICK CONNECT AIR DUCT FITTINGS

BACKGROUND AND OBJECTS OF THE INVENTION

The present invention relates to quickly connectable and disconnectable attachment means for joining a small insulated, flexible, high velocity air tube at one end to a larger cylindrical duct and at the other end to an annular terminator plate or similar device and more particularly to coupling means to facilitate connection and disconnection of an air handling branch duct of a high velocity ducted air type conditioning system to a larger diameter main trunk duct forming a plenum and to a terminator outlet by which a high velocity air stream is discharged into the room to be conditioned.

Heretofore, a high velocity ducted air type conditioning system has been developed to provide heating and/or cooling of spaces to be conditioned by conveying high velocity conditioned air to such spaces from a heating and cooling generator first to an elongated larger diameter cylindrical trunk duct, for example, having an inner diameter of about 7 inches. A plurality of smaller diameter branch ducts, for example, of about 2 inches diameter, suitable to fit within conventional stud building walls, extend from the trunk duct to the ceiling, wall or floor of each of the rooms to be served, where an outlet in the form of an annular terminator device is provided to discharge the high velocity conditioned air into the room in a concentrated air stream at sufficient velocity to induce an air circulation pattern in the room solely by the concentrated air stream which effectively mixes conditioned air with the air in the room to achieve substantially uniform temperature. An example of such a system is disclosed in earlier patent application Ser. No. 690,253, entitled Heating and Cooling System, filed by John J. Dieckmann, one of the coinventors named in the present application. To facilitate installation and repair of the ducting system in such a high velocity air conditioning system, it is desirable that the branch ducts of smaller diameter be readily connectable and disconnectable relative to the main trunk duct and relative to the terminator device in the wall, ceiling or floor of the building room.

An object of the present invention is the provision of novel quick connectable attachment devices to be associated with the opposite ends of high velocity air transmission ducts to facilitate connection of such ducts to a larger diameter duct member and to terminator devices in a bounding surface of a room to be conditioned.

Another object of the present invention is the provision of novel quick connectable attachment devices including a coupling member to be provided at each of the opposite ends of a small insulated flexible high velocity air tube, forming for example, a branch duct of a high velocity air conditioning system to be connected to a mating coupling member connectable to a larger cylindrical encased insulated duct at one end, such as a main trunk duct forming a plenum, and to a terminator outlet plate at the opposite end forming a smooth unobstructed round opening for discharge of a concentrated conditioned air stream into the room.

Other objects, advantages and capabilities of the present invention will become apparent from the following detailed description, taken in conjunction with the accompanying drawings illustrating a preferred embodiment of the invention.

BRIEF DESCRIPTION OF THE FIGURES

FIG. 1 is a somewhat diagrammatic perspective view illustrating a high velocity ducted air type heating system in which the quick connectable attachment devices of the present invention are used;

FIG. 2 is an exploded perspective view of the quick connecting attachment devices employed at one end of the high velocity branch duct to connect the same to the larger diameter main trunk duct;

FIG. 3 is a section view of the plenum takeoff coupling member, showing the same assembled on a main trunk duct or plenum;

FIG. 4 is a fragmentary perspective view with parts broken away, illustrating the manner in which the plenum takeoff coupling member is assembled to the plenum duct;

FIG. 5 is a plan view showing the face of the coupling member connected to the opposite ends of the branch duct;

FIG. 6 is a section view, taken along the line 6—6 of FIG. 5;

DETAILED DESCRIPTION OF A PREFERRED EMBODIMENT

Figure 7:
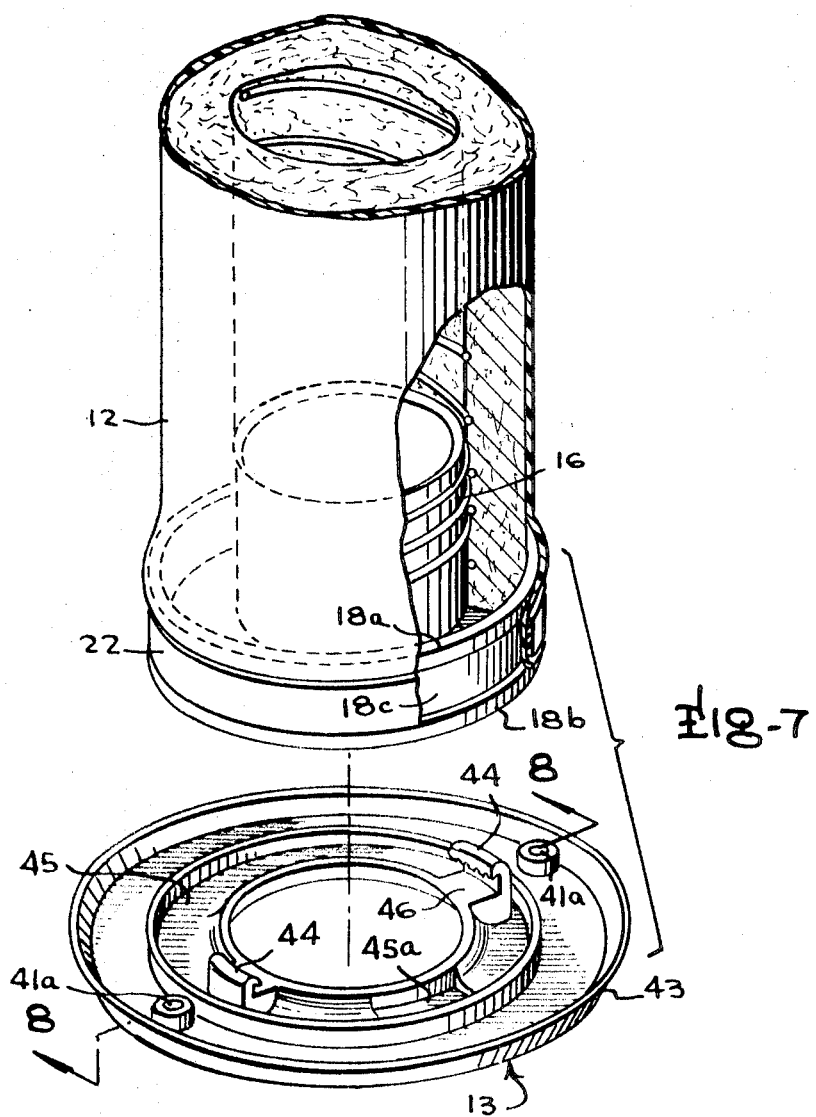
FIG. 7 is a fragmentary perspective view with parts broken away, showing the branch duct coupling member and the terminator plate to be assembled therewith.

Referring to the drawings, wherein like reference characters designate corresponding parts in the several figures, there is shown in FIG. 1 a typical attic installation of a high velocity ducted air type conditioning system for which the quick connecting attachment devices of the present invention are designed. The heating and cooling system may be described generally as comprising a heating and cooling generator 10 located in the attic space of the building and designed to discharge conditioned air from the generator directly into a main trunk duct 11 running above the ceiling joists in the attic of the building and having a plurality of smaller diameter branch ducts 12 extending therefrom to appropriate locations in the building to discharge the conditioned air at high velocity at ceiling level into the rooms of the building. The main trunk duct 11 forms the plenum for the system and may, for example, be formed of 7 inch internal diameter fiberglass tubing 11a encased with aluminum or vinyl film such as by having a covering of aluminum sheet or vinyl film material 11b forming a vapor barrier on its exterior.

The branch ducts 12 are also well-insulated to maintain properly the relatively high and low temperatures of the conditioned air circulated therethrough, and should be airtight and moistureproof to prevent leakage of the high and low temperature air and prevent moisture from accumulating in the insulation or on any surface of the ducts when cold air passes through the ducts. As an example, the branch ducts 12 may each be approximately 2 inch inner diameter flexible tubing having a core, formed for example of a helix 12a such as spring wire or spirally wound metallic strip or a corrugated aluminum core, covered by insulating material 12b, preferably fiberglass wool of high density, and an outer covering of vinyl tubing 12c thereby providing a branch duct whose outer diameter is sufficiently small, and which is sufficiently flexible, to facilitate conveniently running the branch ducts inside standard 2×4 stud partitions.

The branch ducts 12 are connected to an outlet fitting or terminator plate 13, designed to discharge a smooth, unencumbered stream of air into the room to be served, for example, in a downward vertical direction at a velocity which will move the stream of air slightly less than the vertical height of the room with conservation of energy of the stream until it reaches a sufficient distance in the room to induce a moderate flow of substantially all the room air into intermingling relation with the conditioned air to achieve substantially uniform temperatures. Preferably, means are provided to achieve sufficient sound attenuation between the main plenum duct 11 and the terminator plate or outlet fitting 13 to provide a quiet operating system wherein the noise levels are kept at low values acceptable to home owners, but without imposing excessive pressure drop or turbulence that would inhibit this circulation in the room in the desired manner. This may be achieved by either providing sound absorbing tubing for the branch ducts 12 or by interposing sound attenuators immediately upstream from the outlet fitting 13. The quick connecting air duct coupling devices of the present invention are provided to facilitate rapid connection of the upstream end of each branch duct 12 to the main trunk duct 11 forming the plenum system, and to facilitate connection of the outlet fitting or terminator plate 13 to the downstream end of each branch duct 12.

Referring particularly to FIGS. 7—7, there is illustrated a first coupling member 15, which may be molded from plastic, having a somewhat frustoconical inner annular neck portion 16 having short spiral threads 16a on the exterior surface thereof, designed to engage inside the core of branch duct 12. The larger diameter or outer end of the neck portion 16 integrally merges into a circular face plate portion 17 which projects outwardly from the neck portion 16. An outwardly spaced, substantially cylindrical flange portion 18 is integrally joined with the face plate portion 17 adjacent its outermost end and extends therefrom a short distance in the same direction as the neck portion 16 in coaxial relation with the axis of the neck portion, the flange portion 18 having outwardly extending bead formations 18a and 18b at the opposite edges thereof providing a slightly recessed cylindrical groove in the exterior surface of the cylindrical flange portion 18. The face plate portions 17 have a pair of bayonet slots 19 at diametrically opposite portions thereof, each having an enlarged arcuate slot section 19a and a constricted slot section 19b, and additionally includes a pair of bayonet-type protrusions 20, each of right angular configuration defining an enlarged head portion 20a and a smaller cross section stem portion 20b, the head portion 20a of each protrusion projecting inwardly from the stem portion toward the axis of the fitting to define a restraining shoulder having locking teeth 20a' thereon.

One of the coupling members 15 is provided on each end of the branch duct 12, the neck portion 16 being inserted inside the bore of the branch ducts 12. Also, the annular recess 18c on the outer surface of the outer cylindrical flange portion 18 provides an area for the vinyl tubing 12c, forming the jacket, for example of sheet material closed into a tube by a heat sealed seam extending its full length, for the branch duct 12, to be held to the cylindrical flange portion 18 by an annular vinyl shrink band or a polypropylene band clamp secured by pliers, to form an airtight seal. An example of the band clamp construction is shown in FIG. 2, wherein the clamp 21 includes a band portion 22 adapted to encircle the vinyl tubing 12c of the branch duct 12, having an enlargement 23 on one end thereof defining a socket 23a and a serrated projection 24 extending therefrom, and having an enlargement 25 on the other end thereof defining a spear-shaped tongue 25a to be projected into and restrained in the socket 23a and having a recess along the inwardly facing portion of the enlargement 25 provided with teeth 25b designed to mate with the serrations of the serrated projections 24 to coactively connect the ends of the band together along with the socket 23a and tongue 25a.

Adapted to coact and mate with the coupling member 15 on one end of the branch duct 12 is a plenum takeoff coupling member 26, which is also a molded plastic part, having an inner annular neck portion 27 of generally frustoconical configuration, a circular face plate portion 28 joined thereto at the larger diameter end thereof and projecting outwardly therefrom and an outwardly spaced cylindrical flange portion 29 of substantially the same diameter as the flange portion 18 of connecting member 15. The face plate portion 28 of the coupling member 26 has a pair of bayonet-type protrusions 30 extending therefrom at diametrically opposite positions, which, like the protrusions 20 on the coupling member 15, are formed of similarly configured head portions 30a and stem portions 30b, adapted to be projected through the enlarged section 19a of the bayonet slots 19 in coupling member 15 until the head portions are disposed rearwardly of the rear surfaces of face plate portion 17, so that upon relative rotation of the coupling member 15 and coupling member 26, the stem portions 30b will pass into the constricted sections 19b of the bayonet slots 19 and the tooth faces of the head portions 30a will engage and lock against the rear surface of the face plate portion 17. As will be observed in the drawings, the two shoulder portions of the heads of the bayonet-type protrusions are inclined slightly from one end to the other end of the associated protrusion so as to draw the face plates of the respective coupling members 15 and 26 tightly together upon appropriate relative rotation of the coupling members and form an airtight seal once these members are tightened.

To facilitate connection of the plenum takeoff coupling member 26 to the large diameter main trunk duct 11, the rear or free edge of the outwardly spaced cylindrical flange portion 29 is shaped to follow a cylindrical contour to fit the outer radius of the larger main trunk duct 11, so that this free edge of the flange portion 29 butts against and forms an airtight seal at the exterior surface of the main trunk duct 11 when the neck portion 27 is inserted through a prepierced hole of appropriate size in the side of the duct 11. The coupling member 26 is assembled to the main trunk duct 11 with the neck portion 27 inserted in the hole, by a pair of stainless steel spring clips 31, each of a substantially T-shape, having a first T-shaped end portion 32, the head of which is to be inserted into slots 28a which are of T-shaped configuration corresponding to the shape of the end portion 32 when viewed from the front of the coupling member 26, and wherein the narrower portions of the slots 28a extend a short distance into the neck portion 27 of the coupling member as illustrated in FIGS. 2 and 3. The spring clips 31 also have a medial portion 33 lying substantially at right angles to the T-shaped end portion 32, and an enlarged end portion 34 extending from the medial portion 33 in the same direction as the T-shaped end portion 32 but at a slightly sharper angle than 90°. The enlarged end portion 34 is adapted to be passed through the bore in the neck portion 27 of the coupling member 26 when located near the center axis of the neck portion while the head of the T-shaped end portion 32 is located in the larger portion of the slot 28a, after which the spring clip is turned approximately 90° by finger force to bring the enlarged end portions 34 inwardly beneath the adjoining portion of the main trunk duct and until the small pointed spring tabs 35 snap outwardly over the rear free edge of the neck portion 27, thereupon resiliently locking the spring clip in the position shown in FIG. 4. A pair of such spring clips 31 is assembled in this manner to connect the coupling member 26 to the duct 11. While only two of such clips 31, and slots 28a therefor are present in the illustrated embodiment, it will be appreciated that a larger number, for example four clips may be used.

Figure 8:
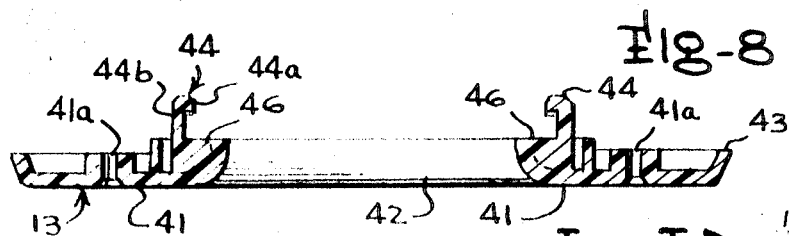
FIG. 8 is a section view of the terminator plate taken along the line 8—8 of FIG. 7.

The outlet fitting or terminator plate forming the outlet orifice for the branch duct is illustrated in FIGS. 7 and 8, and is indicated by reference character 13. This terminator plate is also a molded plastic part having an annular face plate portion 41 surrounding an outwardly flaring circular bore 42 forming the discharge opening for the conduit. The face plate portion 41 has a cylindrical lip 43 at its outer perimeter adapted to butt against the surface of the wall or ceiling or floor of the room in the region surrounding the opening providing for the conditioned air discharged into the room, and the face plate also includes apertures 41a to permit screws or similar fastening means to extend therethrough into the wall, ceiling or floor for mounting the terminator plate on the building wall. The terminator plate 13 also has a pair of bayonetlike protrusions 44, each having a head portion 44a and a stem portion 44b corresponding substantially to the head and stem portions of the bayonet-type protrusions 30 and 20, to be interfitted into the bayonet slots 19 of the coupling member 15 fixed to the adjacent end of the branch duct 12. Also, the terminator plate 13 has a circular groove 45 interrupted by the protrusion 44 and by a pair of slightly deeper wells 45a to accommodate the head portions of the bayonet-type protrusions 19 on the adjacent coupling member 15 throughout the range of relative angular movement permitted by the bayonet slots 19 and mating protrusions 44, so that the face plate 17 can butt tightly against the confronting rear annular surface 46 of the terminator plate 13.

What we claim is:

1. A quick connection system for interconnecting a flexible air tube between a pair of companion air passage sections of a high velocity conditioned air supply system conveying conditioned air to a room and discharging it through an orifice as an undiffused concentrated stream projecting into the room to induce mixing circulation, the air tube comprising a tubular sleeve of insulation material surrounding a central air conveying bore bounded by an inner cylindrical surface and an outer cylindrical cover member surrounding the sleeve, the connection system including an annular first connector of integral molded construction to be assembled on any end portion of the air tube and having a substantially frustoconical annular neck portion sized to tightly fit into the air tube bore in sealing contact with the inner surface of the tube, a face plate portion projecting radially outwardly from one end of the neck portion and defining a flat circular face perpendicular and concentric to the neck portion axis, and an outer annular flange portion integrally extending in the same direction as the neck portion from the face plate portion spaced outwardly in coaxial relation to the neck portion to receive said sleeve in surrounding relation thereon, said face plate portion having coupling formations including a pair of circumferentially spaced bayonet slots and a pair of male bayonet protrusions interspersed between the slots having enlarged head portions spaced from the face; and companion connector structure for said companion air passage sections to be mated with the first connector defining an abutment face to sealingly engage the first connector face with the air passages of the companion sections and said bore in alignment and having means to interfit with said coupling formations for releasably coupling the first connector to either of the companion sections responsive to relative rotation of the first connector about the axis of the bore.

2. A quick connection system as defined in claim 1, wherein said outer flange portion of said first connector has a pair of axially spaced, outwardly projecting circular bead formations on the exterior surface thereof defining an outwardly facing trough to be encircled by said outer cover member of the air tube, and a fastening band for surrounding the cover member to retain the same in said trough for opposing withdrawal of the air tube from assembled relation to the first connector.

3. A quick connection system as defined in claim 1, wherein one of said companion sections is a larger diameter cylindrical conduit having a lateral outlet opening therein for passage of conditioned air into the air tube, the companion connector structure for said conduit comprising a second annular connector having a centrally bored integral neck insertable through the outlet opening in said conduit and a face plate portion projecting radially outwardly from one end of the neck and including a flanged perimeter shaped to sealingly abut against the cylindrical exterior surface of the conduit, encircling the outlet opening, the face plate portion of said second connector defining a flat circular face to sealingly abut the flat face of said first connector and having circumferentially spaced bayonet slots and male bayonet protrusions for mating with the protrusions and slots respectively of the first connector, and said second connector having fasteners slidably and tiltably supported thereon and including shoulder formations movable through the bore of said neck and said outlet opening upon sliding and tilting of the fasteners to dispose the shoulder formations inwardly against wall portions of the conduit bounding the outlet opening therein to secure the second connector thereon.

4. A quick connection system as defined in claim 2, wherein one of said companion sections is a larger diameter cylindrical conduit having a lateral outlet opening therein for passage of conditioned air into the air tube, the companion connector structure for said conduit comprising a second a annular connector having a centrally bored integral neck insertable through the outlet opening in said conduit and a face plate portion projecting radially outwardly from one end of the neck and including a flanged perimeter shaped to sealingly abut against the cylindrical exterior surface of the conduit, encircling the outlet opening, the face plate portion of said second connector defining a flat circular face to sealingly abut the flat face of said first connector and having circumferentially spaced bayonet slots and male bayonet protrusions for mating with the protrusions and slots respectively of the first connector, and said second connector having fasteners slidably and tiltably supported thereon and including shoulder formations movable through the bore of said neck and said outlet opening upon sliding and tilting of the fasteners to dispose the shoulder formations inwardly against wall portions of the conduit bounding the outlet opening therein to secure the second connector thereon.

5. A quick connection system as defined in claim 3, wherein said fasteners each comprise a spring clip having a central leg with a trunnion formation on one end of the leg and an enlarged foot at the other end defining said shoulder formation and extending substantially perpendicular to the leg; the second connector having a slot for each fastener in the neck and face plate portions thereof accommodating sliding movement of the trunnion formation parallel to the axis of the neck and arcuate movement of the fastener about an axis perpendicular to and spaced from the neck axis.

6. A quick connection system as defined in claim 4, wherein said fasteners each comprise a spring clip having a central leg with a trunnion formation on one end of the leg and an enlarged foot at the other end defining said shoulder formation and extending substantially perpendicular to the leg, the second connector having a slot for each fastener in the neck and face plate portions thereof accommodating sliding movement of the trunnion formation parallel to the axis of the neck and arcuate movement of the fastener about an axis perpendicular to and spaced from the neck axis.

7. A quick connection system as defined in claim 1 wherein one of said companion air passage sections is a discharge orifice member to be fixed to a bounding surface of the room, the orifice member being formed of an integral molded body and comprising an annular face plate portion having a rear surface portion adjacent the outer perimeter to abut the bounding surface of the room and a central, outwardly flaring circular bore defining a smooth unencumbered and unobstructed orifice for discharge of the conditioned air therethrough as a concentrated undiffused stream projecting into the room, the face plate portion of the orifice member having rearwardly facing annular surface portions outwardly surrounding said bore therein for engagement by the face of said first connector and a pair of male bayonet protrusions projecting rearwardly and located for interfitting in mating relation in the slots of said first connector to draw said face into sealing abutment with said annular surface portions responsive to relative rotation of the first connector about the axis of said orifice.

8. A quick connection system as defined in claim 3, wherein one of said companion air passage sections is a discharge orifice member to be fixed to a bounding surface of the room, the orifice member being formed of an integral molded body and comprising an annular face plate portion having a rear surface portion adjacent the outer perimeter to abut the bounding surface of the room and a central, outwardly flaring circular bore defining a smooth unencumbered and unobstructed orifice for discharge of the conditioned air therethrough as a concentrated undiffused stream projecting into the room, the face plate portion of the orifice member having rearwardly facing annular surface portions outwardly surrounding said bore therein for engagement by the face of said first connector and a pair of male bayonet protrusions projecting rearwardly and located for interfitting in mating relation in the slots of said first connector to draw said face into sealing abutment with said annular surface portions responsive to relative rotation of the first connector about the axis of said orifice.

9 A quick connection system for interconnecting an air tube to a larger diameter cylindrical conduit having a lateral outlet opening therein for passage of conditioned air from the conduit into the air tube comprising an annular connector device comprising a centrally bored neck insertable through the outlet opening in said conduit, a face plate portion integrally joining said neck and projecting radially outwardly therefrom and an annular flange of shorter axial length than the neck projecting integrally from the face plate portion in outwardly coaxial enshrouding relation to said neck and having a free edge shaped to conform to and sealingly abut the cylindrical exterior surface portion of the conduit encircling the outlet opening, the face plate portion of the connector device defining a flat circular face to sealingly abut a corresponding flat face of connector means on said air tube and having circumferentially spaced bayonet slots and male bayonet protrusions for mating with like formations on said connector means, and a pair of fasteners slidably and tiltably supported thereon and including shoulder formations movable through the bore of said neck and said outlet opening upon sliding and tilting of the fasteners to dispose the shoulder formations inwardly against wall portions of the conduit bounding the outlet opening therein to secure the connector device thereon.

10. A quick connection system as defined in claim 9 wherein said fasteners each have a transversely enlarged head at one end and a transversely enlarged foot at the other end defining a shoulder approximately the diameter of the bore of said neck, diametrically adjoining neck and face plate portions of the connector device having slot means therein for receiving said head and accommodating sliding movement of the fastener heads along axes paralleling the bore axis and concurrent tilting movement about axes paralleling a normal to said bore axis to pass the enlarged feet through said bore into inwardly lapping abutment with wall portions of said conduit to secure the connector device thereon.